Figure 1:
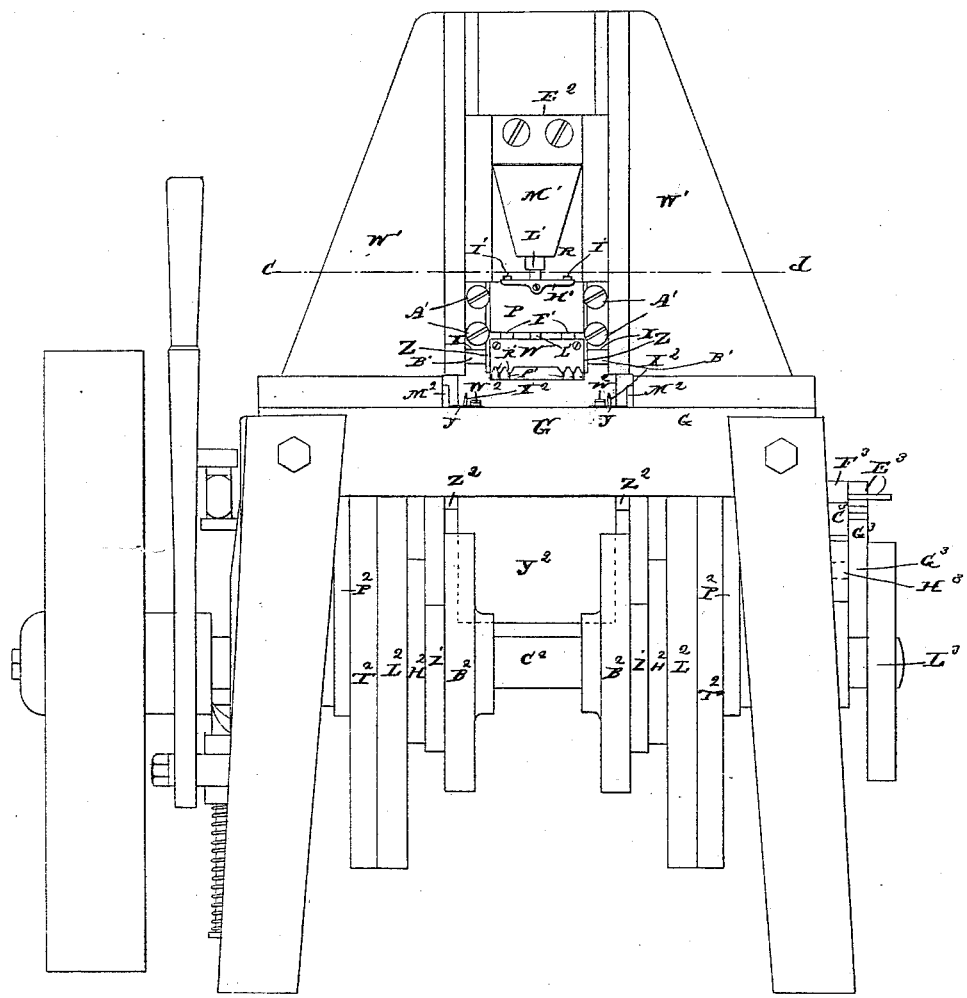

(No Model.) 11 Sheets—Sheet 1.

G. A. BARNES.
MACHINE FOR MAKING PAPER BOXES.

No. 437,963. Patented Oct. 7, 1890.

Witnesses:
Chas. B. Shumway
Bessie Johnson

Inventor
George A. Barnes
By George D. Seymour
atty (No Model.) 11 Sheets—Sheet 2.

G. A. BARNES.
MACHINE FOR MAKING PAPER BOXES.

No. 437,963. Patented Oct. 7, 1890.

(No Model.) 11 Sheets—Sheet 3.

G. A. BARNES.
MACHINE FOR MAKING PAPER BOXES.

No. 437,963. Patented Oct. 7, 1890.

Witnesses:
Chas. B. Shumway
Bessie Johnson

Inventor
George A. Barnes
By Geo. D. Seymour
Atty.

(No Model.) 11 Sheets—Sheet 4.
G. A. BARNES.
MACHINE FOR MAKING PAPER BOXES.

No. 437,963. Patented Oct. 7, 1890.

Witnesses:
Chas. B. Shumway
Bessie Johnson

Inventor
George A. Barnes
By George D. Seymour
Atty (No Model.) 11 Sheets—Sheet 5.
G. A. BARNES.
MACHINE FOR MAKING PAPER BOXES.
No. 437,963. Patented Oct. 7, 1890.
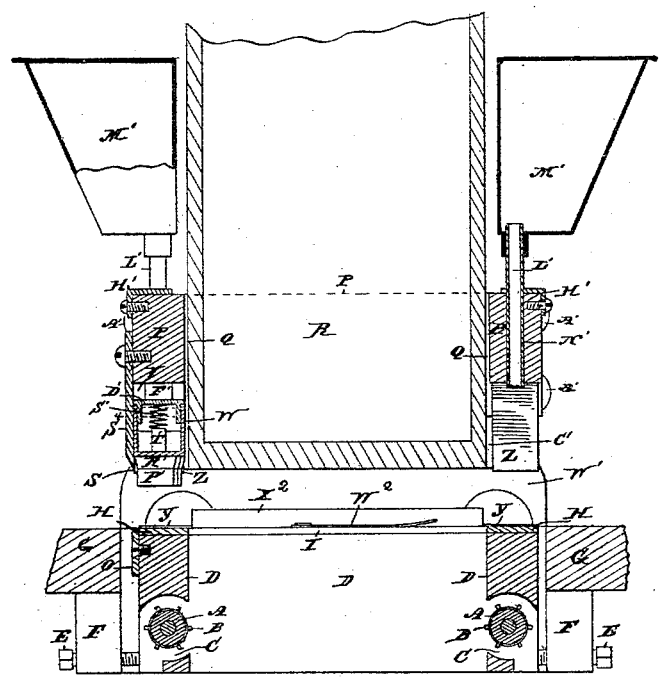
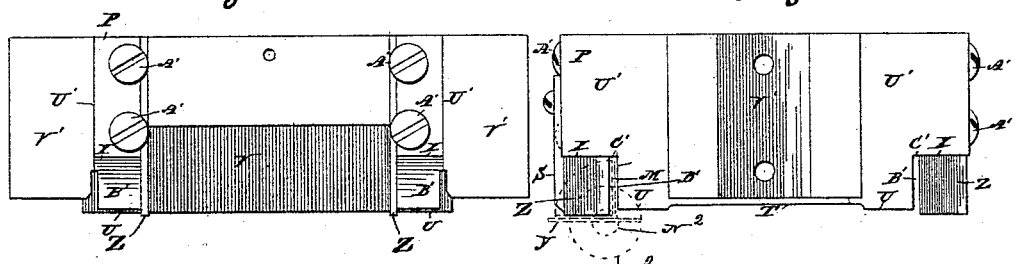
Witnesses:
Chas. B. Shumway
Bessie Johnson
Inventor
George A. Barnes
By Geo. D. Seymour
Atty.

(No Model.) 11 Sheets—Sheet 6.
G. A. BARNES.
MACHINE FOR MAKING PAPER BOXES.
No. 437,963. Patented Oct. 7, 1890.
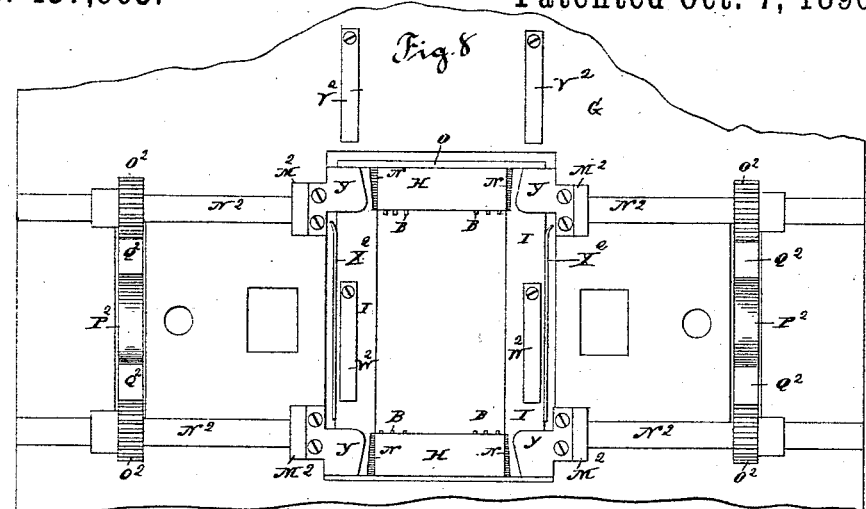
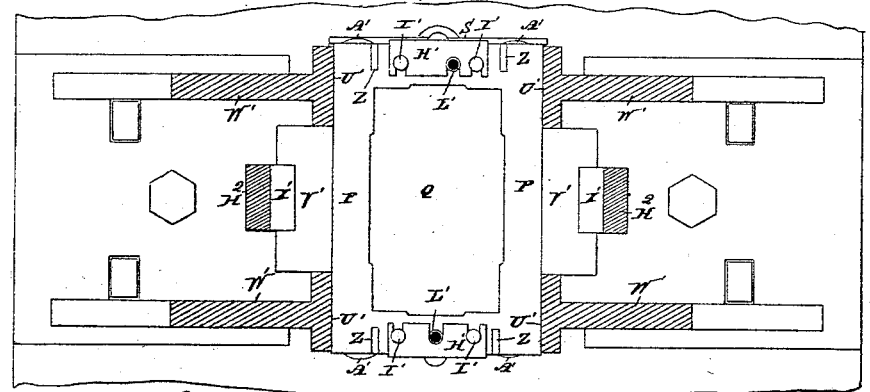
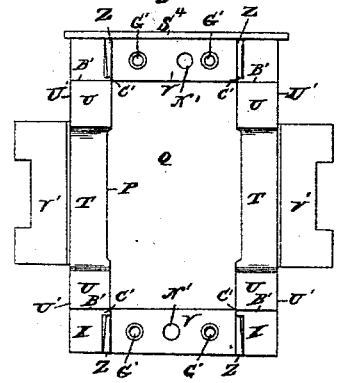
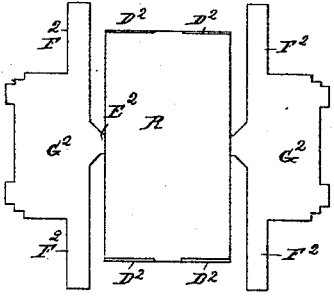
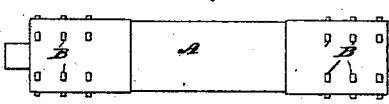
Witnesses:
Chas. B. Shumway
Bessie Johnson
Inventor
George A. Barnes
By George D. Seymour (No Model.)
G. A. BARNES.
MACHINE FOR MAKING PAPER BOXES.
No. 437,963.
11 Sheets—Sheet 7.
Patented Oct. 7, 1890.
Fig. 13
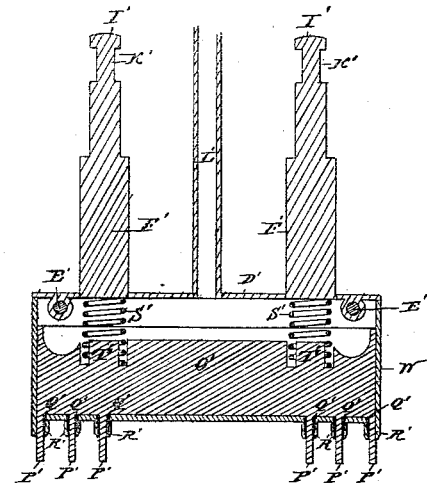
Fig. 14
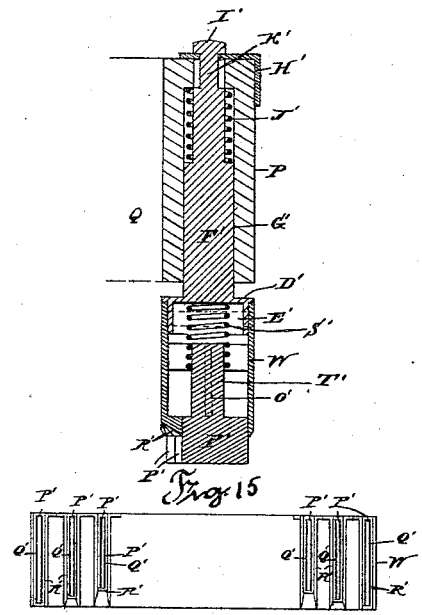
Fig. 15
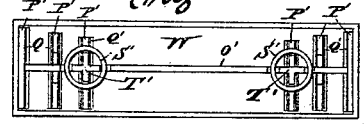
Fig. 16
Witnesses
Chas. B. Shumway
Bessie Johnson
Inventor
George A. Barnes
By Geo. D. Seymour
Atty.

(No Model.)  11 Sheets—Sheet 8.
G. A. BARNES.
MACHINE FOR MAKING PAPER BOXES.
No. 437,963. Patented Oct. 7, 1890.
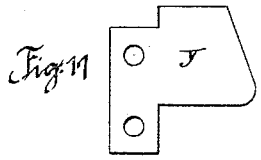
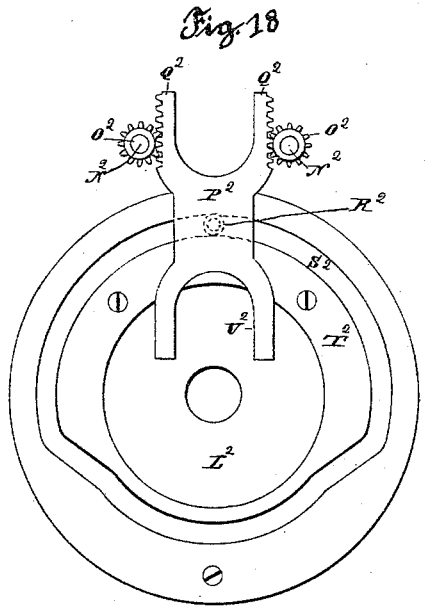
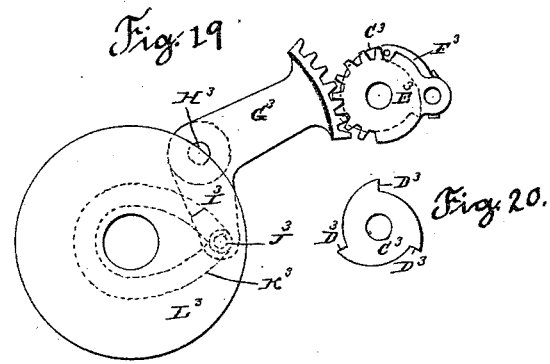
Witnesses
Chas. B. Shumway
Bessie Johnson
Inventor
George A. Barnes
By Geo. Seymour
Atty (No Model.) 11 Sheets—Sheet 9.
G. A. BARNES.
MACHINE FOR MAKING PAPER BOXES.
No. 437,963. Patented Oct. 7, 1890.
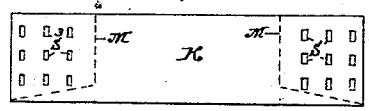
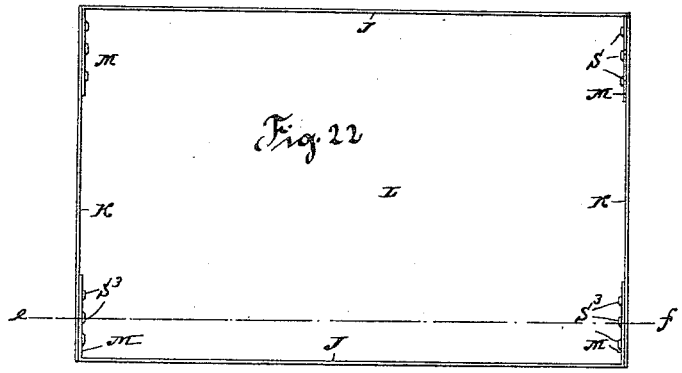
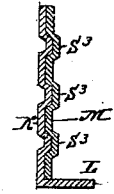
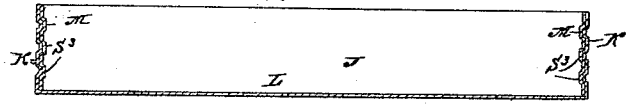
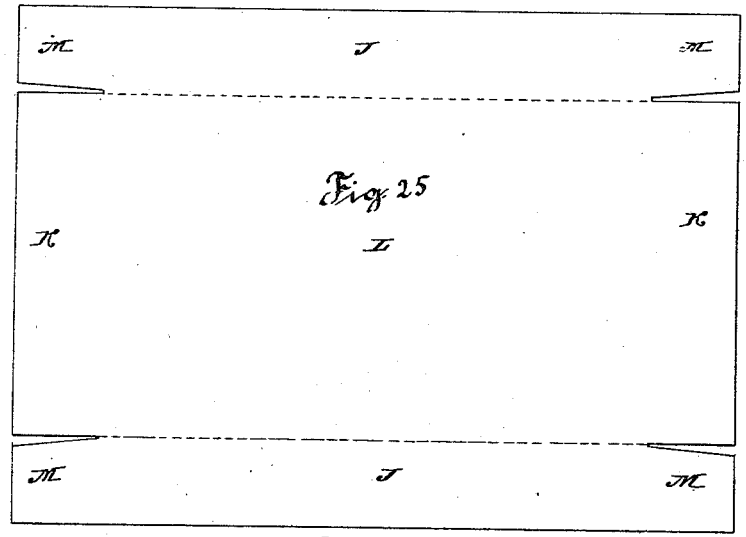
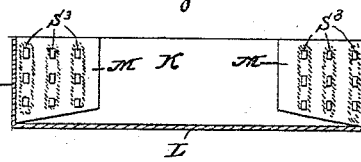

(No Model.) 11 Sheets—Sheet 10.
G. A. BARNES.
MACHINE FOR MAKING PAPER BOXES.
No. 437,963. Patented Oct. 7, 1890.
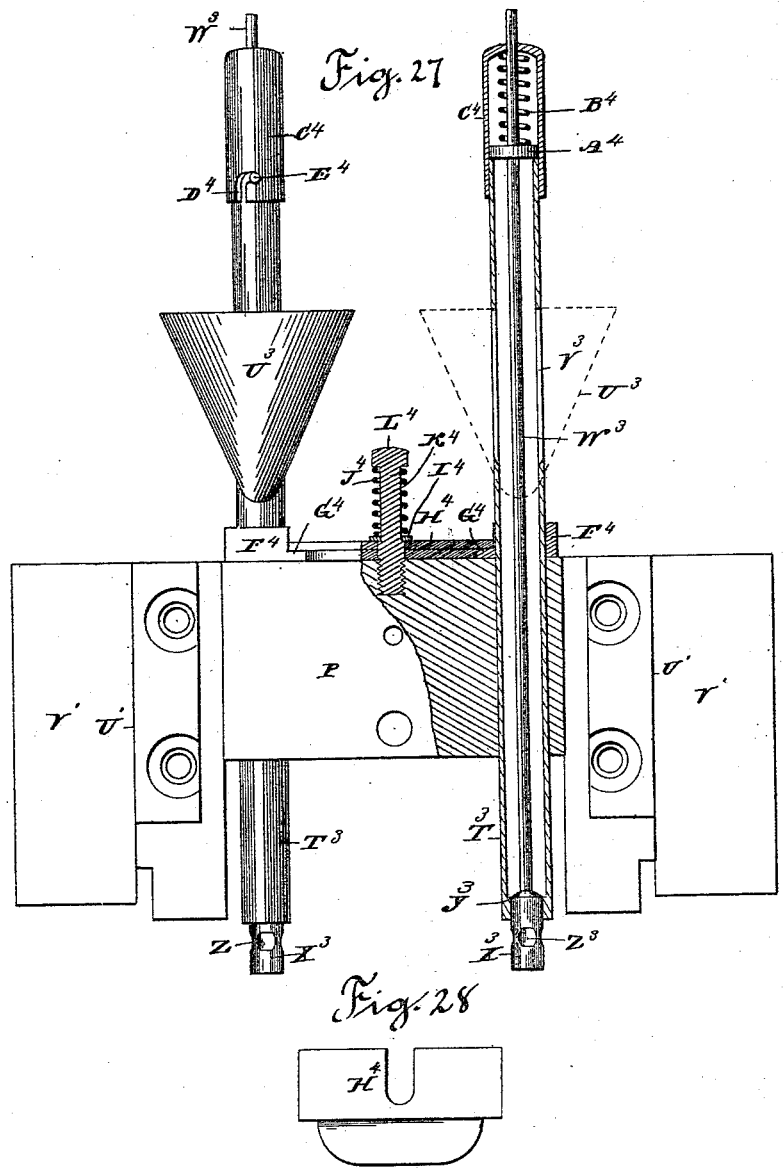
Witnesses:
Chas B. Shumway
Bessie Johnson
Inventor
George A. Barnes
By Geo. D. Seymour
Atty (No Model.) 11 Sheets—Sheet 11.

G. A. BARNES.
MACHINE FOR MAKING PAPER BOXES.

No. 437,963. Patented Oct. 7, 1890.

Witnesses
Fred C. Earle
Lillian D. Kelsey

George A. Barnes, Inventor
by his Atty,
Geo. D. Seymour

UNITED STATES PATENT OFFICE.

GEORGE A. BARNES, OF NEW HAVEN, CONNECTICUT.

MACHINE FOR MAKING PAPER BOXES.

SPECIFICATION forming part of Letters Patent No. 437,963, dated October 7, 1890.

Application filed January 9, 1889. Serial No. 295,894. (No model.)

*To all whom it may concern:*

Be it known that I, GEORGE A. BARNES, residing at New Haven, in the county of New Haven and State of Connecticut, have invented certain new and useful Improvements in Machines for Making Paper Boxes; and I do declare the following to be a full, clear, and exact description of the same, reference being had to the accompanying drawings, which form a part of this specification.

My invention relates to an improvement in machines for making paper boxes, the object being to produce a compact and simple machine having a large capacity for work.

With these ends in view my invention consists in embossing mechanism arranged to emboss the boxes just after they have been gummed and folded, so that they will retain their shape while drying; in novel gumming apparatus for gumming the blanks individually; in peculiar folders for folding the corner sections of the blanks; and in certain details of construction and combinations of parts, as will be hereinafter described, and pointed out in the claims.

Figure 2:
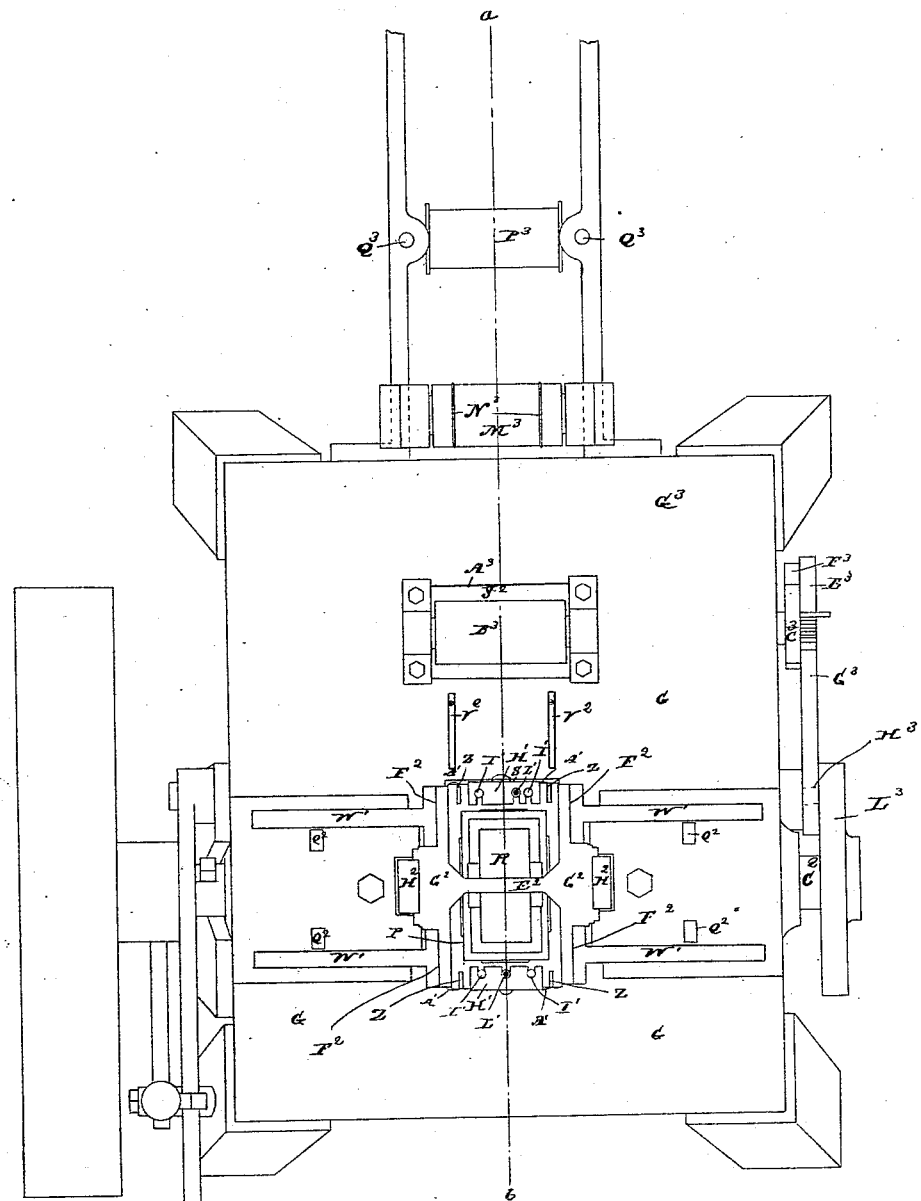
Figure 3:
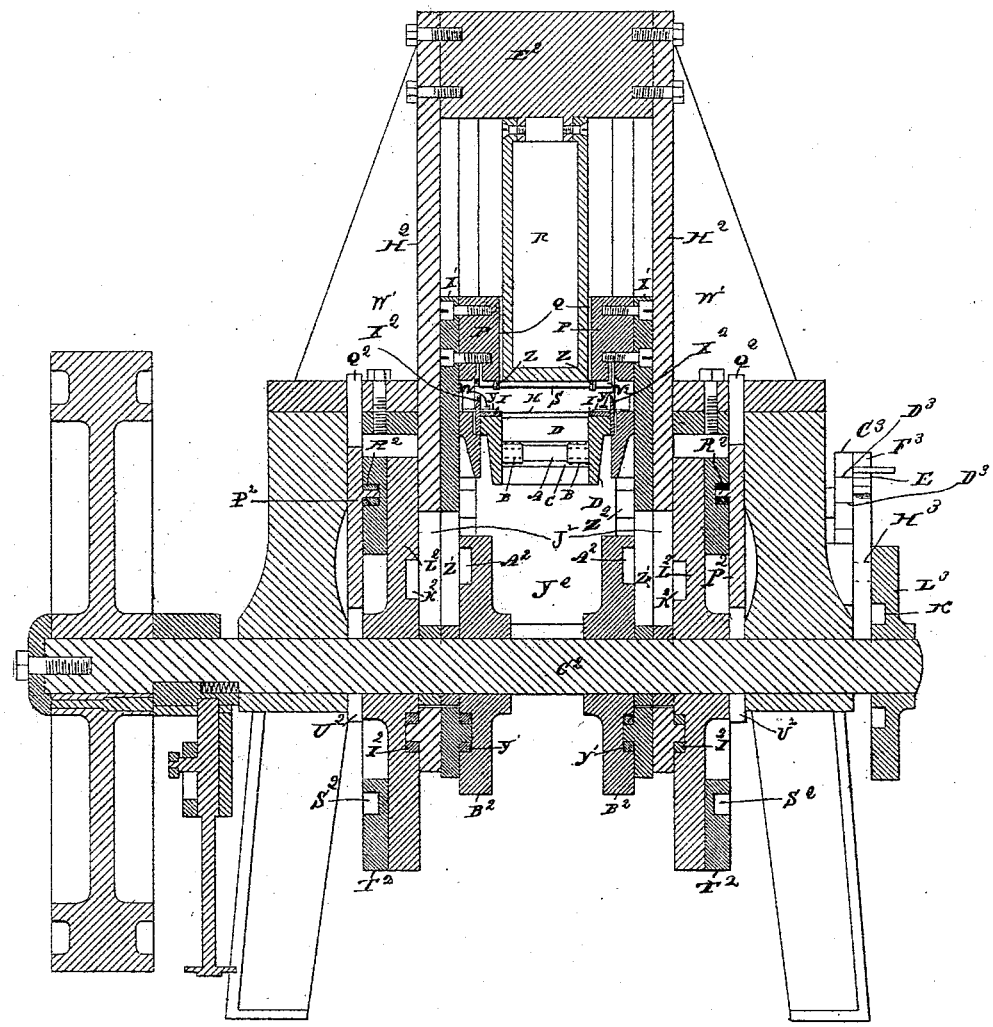
Figure 4:
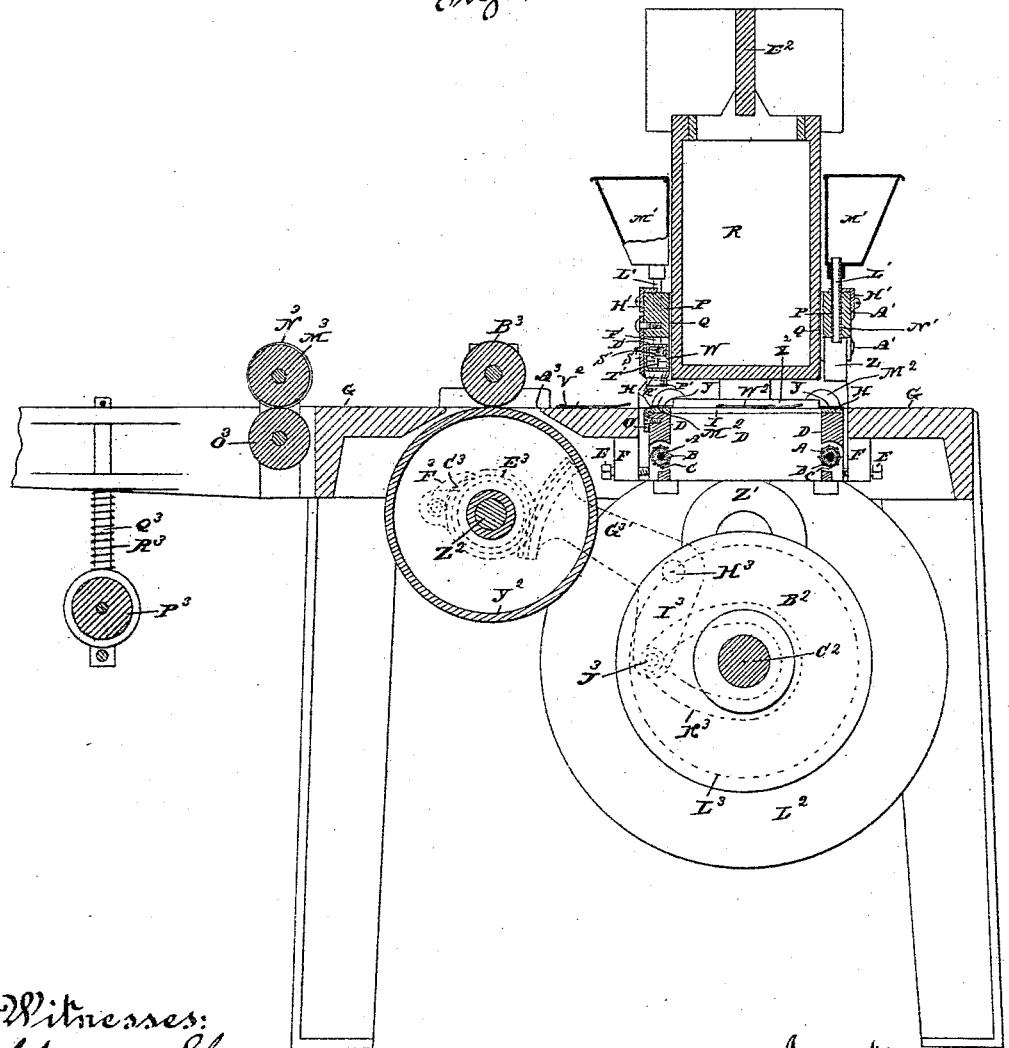
Figure 30:
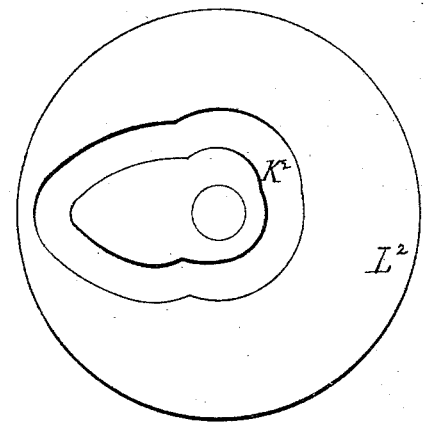
Figure 29:
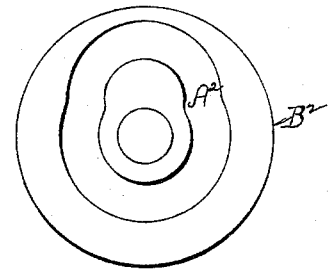

In the accompanying drawings, Figure 1 is a view in front elevation of a machine embodying my invention. Fig. 2 is a plan view thereof. Fig. 3 is a view of the machine in vertical transverse section, taken through the main shaft. Fig. 4 is a view of the machine in vertical longitudinal section on the line $ab$ of Fig. 2. Fig. 5 is a broken enlarged view of the leading features of the preceding view. Fig. 6 is a detached enlarged view, in front elevation, of the cutter-head with the gum-feeding reservoir and shear removed. Fig. 7 is a similar view of the cutter-head in side elevation, and showing by dotted lines the folding up of one of the corner sections of a blank into place to pass inside of the head when the side sections of the blank are folded up. Fig. 8 is an enlarged broken plan view of the die and the machine-bed with the uprights, the cutter-head, the plunger, and the plunger-head removed. Fig. 9 is a broken view, partly in plan and partly in transverse section, on the line $cd$ of Fig. 1, and looking down upon the cuttter-head, the plunger and the plunger-head being removed. Fig. 10 is a detached reverse plan view of the cutter-head with the gum-feeding reservoirs removed. Fig. 11 is a similar view of the plunger and the plunger-head. Fig. 12 is a view in side elevation of one of the embossing-rolls, shown as of full size. Fig. 13 is a detached view, in vertical longitudinal section, of one of the gumming mechanisms. Fig. 14 is a view thereof in transverse section, together with a part of the cutter-head and a retaining-plate. Fig. 15 is a reverse plan view of one of the feeding-reservoirs, showing the distributers and gum-feeders. Fig. 16 is a plan view of one of the said reservoirs with its lid removed and showing its inside. Fig. 17 is a detached plan view of one of the folders, shown as of full size. Fig. 18 is a detached view, in side elevation, of the reciprocating rack, which operates the folders in its relation to its actuating-cam and its two pinions. Fig. 19 is a similar detached view showing the bell-crank lever with the toothed head and notched collar, with which it co-operates to feed the stock. Fig. 20 is a detached view, in side elevation, of the notched collar of the feeding mechanism. Fig. 21 is a view in end elevation of a box made in my improved machine. Fig. 22 is a plan view of such box. Fig. 23 is a view of the box in vertical longitudinal section on the line $ef$ of Fig. 22. Fig. 24 is a view of the box in transverse section, showing one of its end sections and the shortening of the gummed spaces on account of the tapering form of its corner sections. Fig. 25 is a plan view of such a scored and cut blank as the boxes are made from. Fig. 26 is an enlarged sectional view showing the pinning of the overlapping box-sections together by their embossed projections. Fig. 29 is a detached view, in outside elevation, of one of the cams $B^2$ to show the cam-groove $A^2$, formed in its outer face, the cam being shown in the position in which it is represented in Fig. 3; and Fig. 30 is a similar view, in inside elevation, of one of the cams $L^2$ to show the cam-groove $K^2$, formed in its inner face, this cam being also shown in the position in which it is represented in Fig. 3.

Horizontal embossing-rolls A A, encircled near their ends with rows of embossing-pins B, are respectively journaled in recesses C C, (see Figs. 3, 4, and 5,) formed in the end walls of the die-box D, into the interior of which the pins project, so as to emboss the ends of the folded and gummed boxes as the same are pushed down into the box, which is held in place by screws E, located in arms F, depending below the bed G of the machine. Face-plates H H and I I, made of hardened metal, are secured, respectively, to the ends and sides of the upper face of the box, with which they combine to form the folding-die, the side face-plates I I extending throughout the length of the box and including the said end plates between them. The box-blank folded in the said die is composed of the side sections J J, the end sections K K, a bottom or central section L, and four corner sections M, as shown by Figs. 21 to 26 of the drawings.

Four long wedge-shaped openings N, (see Fig. 8,) formed by cutting away the ends of the side face-plates at points opposite the end face-plates, and a knife O, secured to the rear end of the die-box and extending across the wider outer ends of the said openings, are provided for cutting wedge-shaped pieces from the box-blanks.

A rectangular cutter-head P, having a central rectangular opening Q, through which the folding-plunger R plays, is arranged to be vertically reciprocated directly over the die and provided with a transverse blanking-shear S by a plate $S^4$, secured to its rear end in position to co-operate with the rear edge of the adjacent end face-plate and the rear ends of the side face-plates in shearing the blanks from the stock-strip, which is not shown. It may be here remarked that the sole function of the knife O is in connection with cutting the wedge-shaped pieces from the blanks. The shear S, the knife O, and the rear edge of the said adjacent face-plate and the rear ends of the said side face-plates are therefore arranged in the same vertical line. The shear S consists of a thin narrow plate of steel, and is placed inside of the lower edge of a heavy plate $S^4$, which is provided for re-enforcing it and holding it in place. The lower faces of the sides of the said head are cut away, as at T T, to form clearance-spaces for the springs $W^2$ $W^2$, and leaving four folding corners U, (see Fig. 10,) which take the place of transverse scorers. The ends of the head are transversely cut away to form chambers V V, respectively, receiving the gum-feeding reservoirs W W and clearance-spaces X X X X for the folders Y Y Y Y (see Fig. 8) to work in. The said head is provided with four wedge-shaped punches Z Z Z Z, respectively located at the opposite ends of the said reservoirs, each held in place by two screws A' A', and arranged in pairs to enter the openings N, before mentioned, and co-operate with the adjacent edges of the face and end plates and the inner edge of the knife O in cutting the wedge-shaped pieces from the blank. The said punches extend just below the edge of the shearing-knife S, with which the heels or rear ends of the rear pair of punches are exactly in line, as shown by Fig. 10 of the drawings, whereby the blanks are cut off on a line coinciding with the extreme rear ends of the openings formed by the rear pair of punches. The said head is also provided at each corner with an upright wall B' and with a space C', the former forming surfaces for the corner sections M of the blanks to be folded against, and the latter, which are located behind the wedge-shaped punches and in line with the said walls, permitting the said sections to pass to the inside of the head when the side sections J of the blanks are folded up by the folding-plunger and die.

The feeding-reservoirs W W, (see Figs. 13, 14, 15, and 16,) which are rectangular in general outline, are each provided with a removable lid D', held in place by horizontal transverse pins E' E'. Each of the lids is provided upon its outer face with two upright parallel posts F', which pass through holes G', (see Fig. 10,) formed in the ends of the cutter-head, from which the reservoirs are suspended by retaining-plates H' H', secured thereto, and slotted, to be slipped under heads I', formed at the upper ends of the posts. The said cutter-head and posts are cut away (see Fig. 14) to receive springs J', of which there is one for each post. These springs have the twofold function of holding the reservoirs in their normal positions and of yielding and permitting them to retire, and so escape being damaged in any part in case the stock runs unevenly as to thickness, or in case any obstruction comes under them. To permit this play of the posts in the plates H' H', they are necked or cut away under their heads, as at K'.

Feed-pipes L' L', secured to the lids of the respective reservoirs, supply them with gum from fonts M' M', removably applied to the upper ends of the said pipes, which pass through openings N' N' formed for them in the ends of the said head.

A plate O', extending throughout the length of each reservoir and located in the center thereof, is provided at each of its ends and upon its lower edge with three transverse gum-feeding blades P', which play loosely in tapering openings Q', formed in the bottom of the reservoir, from which ribs R', respectively inclosing the said openings, offset and form gum-distributers. The said blades are normally projected through the said openings and beyond the said ribs by means of spiral springs S' S', set into the upper edge of the plate and over fingers T' T', projecting inwardly from the inner blade of each group and pressing against the lid. The said openings and blades are graduated in length, as best shown by Figs. 14, 15, and 16 of the drawings, so that the end sections of the blanks will not be gummed where they are exposed by the cutting away of the wedge-shaped pieces, as described, an open space being left in the completed boxes below the lower edge of each of the corner-sections, as clearly shown by Fig. 24 of the drawings. This provision prevents the exposure of any gummed surfaces on the insides of the boxes. Normally the blades are projected through the openings and beyond the ribs, as described, and coated with a thin film of gum. When the head descends, the outer ends of the blades engage with the box-blank over the die, whereby the blades are pushed back into the reservoir. As they retire, the film of gum upon them is skimmed off by the ribs, which distribute it over the blank when they are brought into contact with the same. When the head is lifted, the spiral springs push the blades out recoated with a film of gum, which is not stripped during their outthrow through the tapering openings.

Each side of the cutter-head is provided with two bearing-faces $U'$ and with a recessed extension $V'$, located between them. (See Fig. 10.) Uprights $W'$ $W'$ are secured to the bed of the machine on opposite sides of the die in position to engage with the said bearings upon the opposite sides of the head. Connecting-rods $X'$, respectively secured to the recessed extensions $V'$ $V'$ of the head, are each provided at their lower ends and upon their inner faces with a roll $Y'$, above which an elongated slot $Z'$ is formed. The rolls $Y'$ of the said rods respectively enter cam-grooves $A^2$, formed in the outer faces of two cams $B^2$, located on the main driving-shaft $C^2$, which passes through the slots $Z'$, giving right direction to the throw of the rods which operate to actuate the head in vertical reciprocation.

A folding-plunger R, (see Fig. 11,) adapted to play in the central rectangular opening Q of the cutter-head P, is provided at each of its lower corners with recesses $D^2$, leading out of its working-face and designed to accommodate the double thickness at these points, caused by folding up the corners of the box-blank, and to give clearance to the pins of the embossing-rolls. The upper end of the plunger is provided with a plunger-head $E^2$, the opposite ends whereof are each provided with two bearing-faces $F^2$ and with an extension $G^2$, located between them. The said plunger-head extends out over the cutter-head and is interposed between the uprights $W'$ $W'$, against which its bearing-faces work.

Connecting-rods $H^2 H^2$, respectively located adjacent to the outer faces of the rods $X'$ $X'$, are connected at their upper ends to the binding-extensions $G^2$ $G^2$ of the plunger-head, and each provided at their lower ends with a roll $I^2$ and with an elongated slot $J^2$. The said rolls respectively enter cam-grooves $K^2$, located in the inner faces of cams $L^2$, mounted on the main shaft aforesaid, which passes through the slots and secures right direction in the actuation of the rods.

Four flat folders Y Y Y Y (see Fig. 8) normally lie flat upon the respective corners of the die, such corners being formed by the ends of the side plates I I thereof. Each folder is secured to a separate head $M^2$, and each head is attached to an independent horizontal spindle or shaft $N^2$, mounted in the bed G of the machine and provided at its outer end with a pinion $O^2$, as shown. The said spindles or centers are arranged parallel with the ends of the die and located in planes intersecting the same near its ends.

Two racks $P^2$ $P^2$, respectively located on opposite sides of the die, are each provided at their upper ends with two rack-arms $Q^2$ $Q^2$, having sufficient spread to engage with the two pinions $O^2$ adjacent to them, and with an anti-friction roll $R^2$, entering a cam-groove $S^2$, formed in the outer face of a cam $T^2$, bolted to the outer face of the adjacent cam $L^2$ aforesaid. The lower ends of the racks are cut away, as at $U^2$, so as to clear the main shaft. The cam-grooves $S^2$ are formed so that the racks will be reciprocated and operate the folders in consonance with the other parts of the machine.

Two springs $V^2$ $V^2$, secured to the bed of the machine in the path of the stock-strip, are provided for lifting the same clear of the rear pair of folders. Two similar springs $W^2 W^2$, secured to the side plates I I of the die, are provided for lifting the stock-strip above the forward holders.

Two guides $X^2$ $X^2$, secured to the opposite sides of the die-box and standing above the side face-plates, are provided for guiding the stock-strip. The stock is fed forward (see Fig. 4) by means of a roll $Y^2$, mounted below the bed G of the machine on a shaft $Z^2$, and so that its periphery will extend up through an opening $A^3$ formed therein, in position to co-operate with an idle-roll $B^3$, located above the same. The said shaft $Z^2$ is provided at one end with a fixed collar $C^3$, (see Fig. 20,) having, as herein shown, three equidistant notches $D^3$ in its periphery, and with a loose head $E^3$, carrying a pawl $F^3$, arranged to engage with the fixed collar through the notches thereof, and having a portion of its periphery toothed for engagement by a toothed segment forming the outer end of the arm $G^3$ of a bell-crank lever mounted on a stud $H^3$, and having its other arm $I^3$ provided with a roll $J^3$, entering a cam-groove $K^3$, formed in the outer face of a cam $L^3$, mounted on the main shaft of the machine. The strip is longitudinally scored by means of an idle-roll $M^3$, having scoring-ribs $N^3$ at its ends and co-operating with a wooden roll $O^3$, located beneath it. A roll $P^3$, carried by vertically-movable posts $Q^3$, encircled by springs $R^3$, is provided for keeping the strip taut as it is supplied to the machine.

A box made in my improved machine is shown in Figs. 21 to 26, inclusive, of the drawings. It consists, as before described, of a bottom section L, representing the size of the die-opening, side sections J J, end sections K K, which are gummed at their ends, and corner sections M M M M, which are separated from the end sections by wedge-shaped slots.

The interpenetrating bosses S³ show the action of the embossing-rolls.

Having described my improved machine in detail, I will now set forth the mode of its operation.

The machine being properly timed and charged with stock, every actuation of the feed-roll feeds forward and longitudinally scores such a length of stock as is required for a box. As the stock is advanced its forward end rides up over the first pair of clearance-springs, which prevent any opportunity of its engagement with the rear pair of folders. The end of the strip then enters between the strip-guides and rides up over the second or forward pair of clearance-springs, which prevent it from fouling with the forward pair of folders. The cutter-head now comes down and first punches four wedge-shaped pieces out of the stock over the die. Then as the head descends still lower the shearing-knife cuts off a blank on the line of the outer ends or heels of the rear pair of wedge-shaped openings just formed. Meanwhile the gum-feeding blades, with their lower ends in engagement with the stock, have been retired into the reservoirs, leaving a deposit of gum on each of the gum-distributing ribs, which are now brought down upon the stock, the gum being applied to the ends of the end sections of the blank in elongated patches. The blank being now held between the cutter-head and the die, the folders, which are under its corner sections, are lifted to fold the same up against the upright corner walls of the cutter-head, the stock being broken on the outer edges of the folding corners thereof. The cutter-head now retires, the folding-plunger having first descended upon the blank to hold it from being lifted with the cutter-head. The folding-plunger now begins to push the blank down into the die, the side and end face-plates whereof respectively lift up and fold its side and end sections. As these sections are being folded the folded corner sections, which are located at the ends of the side sections, pass through the spaces behind the wedge-shaped punches and into the inside of the cutter-head, when the end sections are folded up against and outside of them. The punch continuing in its descent, with the box folded around its end, carries the same to the embossing-rolls, which rotate and press their bosses or pins into the ends of the box from the outside thereof, so as to form interlocking projections. The folding-plunger now retires and a new box is formed and embossed, and so on, the embossing operation serving to bind the box, so as to hold it when the gum is drying, whereby elaborate and expensive drying appliances are avoided. It is to be noted that the blanks are virtually gummed individually—that is, while being cut from the strip—and that there is no transverse scoring, the paper being broken on the edges of the folding corners of the cutter-head and between the ends of the folding-plunger and the end face-plates of the die.

Fig. 27 of the drawings is a detached rear view of the cutter-head, with the shearing-knife and the rear pair of punches removed, and showing that form of gumming apparatus which I prefer to employ, the head and apparatus being shown partly in elevation and partly in section; and Fig. 28 is a detached plan view of one of the keys. This gumming apparatus has four independent tubes T³, of which only two are shown, two tubes being located at each end of the cutter-head. Each of these tubes is provided just above its longitudinal center with a conical fount U³, holding a supply of gum, which passes into the tube through an opening V³ formed in the same. A long rod W³ is located within and extends above each tube, being provided at its lower end with a piston X³, playing in a collar Y³ formed in the lower end of the tube. This piston is cut away, as at Z³, to form pockets, in which the gum is fed out of the tube and forms the gum-feeder, supplying the gum to the extreme lower end of the tube, which forms the gum-distributer. The upper end of the rod is provided with a washer A⁴, adapted to rest upon the upper edge of the tube and forming a seat for the lower end of a spring B⁴, encircling the rod above the collar and impinging at its upper end against a cap C⁴, sleeved over the upper end of the tube and provided with a cam-slot D⁴, receiving a pin E⁴ projecting from the tube. The washer limits the downward movement of the piston, which the spring exerts a constant tendency to push out of the lower end of the tube. By removing the cap the rod and piston may readily be removed and replaced. Each tube is provided midway of its length with a block F⁴, having an inwardly-projecting flange G⁴. The flanges of the blocks of the two adjacent tubes are engaged by the opposite edges of a slotted key H⁴, which is slipped under a washer I⁴, held down by a spiral spring J⁴, encircling a pin K⁴, standing up from the end of the cutter-head at a point between the two tubes, and provided at its upper end with a head L⁴ for the upper end of the spring to impinge against. This key, in combination with the headed pin and spring, holds the tubes in place in the cutter-head, permitting them to yield in case of undue pressure upon their lower ends.

One great advantage of the above form of gumming apparatus is that the apparatus may be removed without disturbing the shearing-knife or the punches by simply removing the said key.

In the operation of the apparatus above described the pistons normally project below the lower ends of the tubes and carry a small quantity of gum. When the cutter-head descends, the pistons are engaged with the box-blank and retire, leaving the gum upon the lower edges of the tubes, which are thus permitted to come down upon the blank and transfer the gum thereto. Meanwhile the pistons are recharged with gum, which flows into their pockets when they are pushed back into the tubes.

Having fully described my invention, what I claim as new, and desire to secure by Letters Patent, is—

1. In a machine for making paper boxes, the combination, with mechanism, substantially as described, for cutting, gumming, and folding the box-blanks, of embossing mechanism having upsetting-points, substantially as described, combined with the folding-die of the said folding mechanism, and adapted to project thereinto to inwardly upset and virtually pin together overlapped portions of the folded blanks.

2. In a machine for making paper boxes, the combination, with mechanism, substantially as described, for cutting, gumming, and folding the box-blanks, of embossing-rolls combined with the folding-die of the folding mechanism and provided with points adapted to inwardly upset and virtually pin together overlapping portions of the folded and gummed blanks, substantially as described.

3. In a machine for making paper boxes, the combination, with a folding-die, of a cutter-head adapted to be reciprocated directly over the same, punches and a knife carried by the said head, a folder located at each corner of the die and adapted to fold the corner sections of a blank, gumming apparatus, substantially as described, carried by the said head and adapted to gum the blanks after they are in position to be folded in the die, a folding-plunger working in the said head, and embossing-rolls combined with the folding-die and provided at their ends with points which project thereinto and co-operate with the plunger to inwardly upset portions of the overlapped corner and end sections of the blanks and virtually pin them together, substantially as described.

4. In a machine for making paper boxes, the combination, with a folding-die, of a head adapted to be reciprocated over the same, a folding-plunger working through the said head, and gumming apparatus, substantially as described, carried by the head and including a reservoir and feeders, the latter being arranged to feed the gum from the reservoir when the blanks are in position to be folded, substantially as described.

5. In a machine for making paper boxes, the combination, with a folding-die, of a head adapted to be reciprocated over the same, a folding-plunger working through the head, four wedge-shaped punches and a shearing-knife carried by the head, four folders located at the four corners of the folding-die, and gumming apparatus, substantially as described, also carried by the head and including a reservoir and feeders, the latter being arranged to feed the gum from the reservoir when the blanks are in position to be folded, substantially as set forth.

6. In a machine for making paper boxes, the combination, with a folding-die, of a head adapted to be reciprocated over the same, a folding-plunger working through the head, four punches and a shearing-knife carried by the head, and two gumming apparatus, substantially as described, also carried by the head and respectively located at the opposite ends thereof and between the said punches, which are arranged in two pairs, respectively located at the opposite ends of the head, the opposite ends of the blanks being simultaneously gummed when on the said die stantially as described.

7. In a machine for making paper boxes, the combination, with a folding-die, of a head adapted to be reciprocated over the same, a folding-plunger working through the die, punches and a shearing-knife carried by the head, gumming apparatus, substantially as described, also carried by the head and arranged to simultaneously gum the opposite ends of the blanks, and embossing mechanism, substantially as described, combined with the die and co-operating with the plunger in inwardly upsetting and virtually pinning together overlapped portions of the blanks, substantially as described.

8. In a machine for making paper boxes, the combination, with a reciprocating head, of gumming apparatus applied thereto, having gum-distributers and gum-feeders, the latter playing in the former and retiring to permit them to come down upon the box-blanks, substantially as set forth.

9. In a machine for making paper boxes, the combination, with a folding-die, of a cutter-head adapted to be reciprocated directly over the same, punches and a knife carried by the said head, a folding-plunger adapted to be reciprocated through the said head independently thereof, and gumming apparatus, substantially as described, carried by the head and adapted to yield to prevent damage to it, substantially as described.

10. In a machine for making paper boxes, the combination, with a folding-die, of a cutter-head adapted to be reciprocated directly over the same, four wedge-shaped punches and a shearing-knife carried by the said head, gumming apparatus, substantially as described, applied to the head and adapted to simultaneously gum both ends of the blanks after the same are in position to be folded in the die, and a folding-plunger adapted to be reciprocated through the cutter-head and independently thereof, substantially as described.

11. In a machine for making paper boxes, the combination, with a folding-die, of a cutter-head adapted to be reciprocated directly over the same, four punches carried by such head to simultaneously punch wedge-shaped pieces from near the corners of the blanks, and a folding-plunger reciprocating through the said head and independently thereof, substantially as set forth.

12. In a machine for making paper boxes, the combination, with a folding-die, of a cutter-head adapted to be reciprocated directly over the same, wedge-shaped punches carried by the head and arranged to cut wedge-shaped pieces from near the corners of the box-blanks after the same are upon the die in position to be folded therein, and a shearing-knife located on the said head, so as to shear the blanks from the stock-strip, substantially as described.

13. In a machine for making paper boxes, the combination, with a folding-die, of a cutter-head adapted to be reciprocated directly over the die and carrying a knife, punches, and gumming apparatus, substantially as described, to punch, cut off, and gum a box-blank after the same is upon the die in position to be folded therein, and a folding-plunger adapted to be reciprocated through the cutter-head and independently thereof, substantially as set forth.

14. In a machine for making paper boxes, the combination, with a folding-die, of a thin flat folder for each corner thereof, arranged to fold the corner sections of the blank, the said folders normally resting upon the corners of the die and turning on centers located in planes intersecting the die near the ends thereof, substantially as described.

15. In a machine for making paper boxes, the combination, with a folding-die, of a folder normally lying flat upon each corner thereof and lifted to fold the corner sections of the blank, a rotatable head for each folder, and means for rotating the said heads, substantially as set forth.

16. In a machine for making paper boxes, the combination, with a folding-die, of a folder normally lying flat upon each corner thereof, a spindle and a pinion for each folder, and two cam-actuated racks, each having two rack-arms for operating the folders, substantially as set forth.

17. In a machine for making paper boxes, the combination, with a folding-die, of a cutter-head adapted to be reciprocated directly over the same, a knife and punches carried by the said head, a folding-plunger adapted to be reciprocated through the said head, and a gumming apparatus, substantially as described, secured to the cutter-head and comprising a tube, a gum-fount applied thereto, and a yielding piston located in the lower end of the tube and feeding gum therefrom, substantially as described.

18. In a machine for making paper boxes, the combination, with a folding-die, of a cutter-head adapted to be reciprocated directly over the same, a knife and punches carried by the said head, a folding-plunger adapted to be reciprocated through the said head, a gumming apparatus secured to the cutter-head and comprising a tube, a gum-fount applied thereto, a rod located in the tube, a piston located at the lower end of the rod and provided with pockets in which the gum is fed from the tube, a spring located at the upper end of the tube and adapted to push the rod downward, and means for holding the spring in place, substantially as described.

19. In a machine for making paper boxes, the combination, with a reciprocating head, of a tube, a gum-fount connected therewith, and a gum-feeding piston located at the lower end of the tube, the tube being adapted to yield under undue pressure, so as to prevent damage, and its lower end forming the gum-distributer, substantially as described.

20. In a machine for making paper boxes, the combination, with a reciprocating head, of two tubes, each having a gum-supply connected with it and a yielding gum-feeder, and a removable spring-pressed key connecting the tubes and permitting them to retire under undue pressure, substantially as set forth.

In testimony whereof I have signed this specification in the presence of two subscribing witnesses.

GEORGE A. BARNES.

Witnesses:
CHAS. B. SHUMWAY,
EDWARD H. BOYER.